US012337338B2

(12) United States Patent
Alluigi

(10) Patent No.: US 12,337,338 B2
(45) Date of Patent: Jun. 24, 2025

(54) DISPENSERS FOR PASTY PRODUCTS WITH DELIVERY VALVE

(71) Applicant: GUALA DISPENSING S.P.A., Alessandria (IT)

(72) Inventor: Riccardo Alluigi, Alessandria (IT)

(73) Assignee: Guala Dispensing S.P.A., Alessandria (IT)

( * ) Notice: Subject to any disclaimer, the term of this patent is extended or adjusted under 35 U.S.C. 154(b) by 243 days.

(21) Appl. No.: 18/043,126

(22) PCT Filed: Oct. 27, 2021

(86) PCT No.: PCT/IB2021/059911
§ 371 (c)(1),
(2) Date: Feb. 27, 2023

(87) PCT Pub. No.: WO2022/090948
PCT Pub. Date: May 5, 2022

(65) Prior Publication Data
US 2023/0311143 A1 Oct. 5, 2023

(30) Foreign Application Priority Data
Oct. 28, 2020 (IT) ........................ 102020000025597

(51) Int. Cl.
*B05B 11/00* (2023.01)
*A47K 5/18* (2006.01)
(Continued)

(52) U.S. Cl.
CPC ............ *B05B 11/1033* (2023.01); *A47K 5/18* (2013.01); *B05B 11/028* (2023.01); *B05B 11/1053* (2023.01)

(58) Field of Classification Search
CPC ............... B05B 11/1028; B05B 11/028; B05B 11/1053; B05B 11/1033; B05B 11/1069;
(Continued)

(56) References Cited

U.S. PATENT DOCUMENTS 4,154,371 A 5/1979 Kolaczinski et al.
4,347,953 A * 9/1982 Bauer ..................... F04B 43/08 222/207
(Continued)

FOREIGN PATENT DOCUMENTS

EP 0286608 A2 10/1988
FR 2581370 A1 11/1986
(Continued)

OTHER PUBLICATIONS

International Search Report and Written Opinion for International Patent Application No. PCT/IB2021/059911, mailed Feb. 8, 2022, 13 pages.

*Primary Examiner* — Charles P. Cheyney
(74) *Attorney, Agent, or Firm* — Armstrong Teasdale LLP

(57) ABSTRACT

A dispenser for pasty products which has a head, a pump, an actuator, and a container tube is provided. The pump is provided with a flexible annular lip protruding out of the pump and inserted into an initial section of a dispensing tube of the head, configured to sealingly come into contact with an initial surface of the initial section to form an upper or delivery valve.

14 Claims, 5 Drawing Sheets

(51) Int. Cl.
*B05B 11/02* (2023.01)
*B05B 11/10* (2023.01)

(58) Field of Classification Search
CPC .. B05B 11/007; B65D 83/0033; B65D 83/765
USPC .................................. 222/209, 207, 212, 387
See application file for complete search history.

(56) References Cited

U.S. PATENT DOCUMENTS 4,402,431 A 9/1983 Wiegner et al.
4,771,925 A * 9/1988 Stoffler ................. F16K 15/144 222/207
4,821,926 A * 4/1989 Battegazzore ..... B65D 83/0033 222/387
4,936,493 A * 6/1990 Foster ................... B05B 11/028 222/209
4,949,876 A * 8/1990 Schneider ............ B65D 47/283 222/207
4,962,870 A * 10/1990 Schneider ........... B05B 11/1028 222/207
4,978,037 A * 12/1990 Schuckmann ..... B65D 83/0033 222/391
5,052,592 A * 10/1991 Wilken .............. B65D 83/0033 222/391
10,493,475 B1 * 12/2019 Yang ..................... B05B 11/028
10,926,281 B2 * 2/2021 Rossignol ........... B05B 11/1069

FOREIGN PATENT DOCUMENTS

WO 2012165727 A1 12/2012
WO 2019162784 A1 8/2019

* cited by examiner

DISPENSERS FOR PASTY PRODUCTS WITH DELIVERY VALVE

CROSS-REFERENCE TO RELATED APPLICATIONS

This application is a National Stage Application of International Patent Application No. PCT/IB2021/059911, having an International Filing Date of Oct. 27, 2021, which claims priority to Italian Application No. 102020000025597, filed Oct. 28, 2020, the entire contents of each of which are hereby incorporated by reference herein.

FIELD OF THE INVENTION

The subject matter of the present invention is a pushbutton dispenser for pasty products, particularly for toothpastes.

BACKGROUND OF THE INVENTION

Such dispensers have been known for some time, and the Applicant itself holds the patent family coming under document U.S. Pat. No. 4,821,926. Such dispensers have been and continue to be widely known for certain advantages that set them apart from normal toothpaste tubes, such as, for example, ease of use, the ability to dispense practically all of the toothpaste without any remaining, and other advantages.

There are essentially two types of these dispensers on the market.

A first type, used especially for high-viscosity pastes, provides a metal stop ring on the bottom of the tube which, when the pushbutton is released (suction phase), advances together with the piston toward the top of the tube and prevents the piston from recoiling toward the bottom of the tube when the pushbutton is pressed (dispensing phase). An embodiment example is described in document U.S. Pat. No. 4,154,371.

A second type, used especially for medium- or low-viscosity pastes, instead comprises parts having lips or diaphragms that work as check valves, and therefore the piston does not have to cooperate with a stop ring. An embodiment example is described in document U.S. Pat. No. 4,402,431.

This latter type is quickly becoming widespread because it is possible to make all the components out of plastic materials belonging to the same family. As such, these dispensers are easily recyclable and meet current environmental protection requirements. However, these dispensers have numerous complex components, making the industrial costs of design, manufacture, and assembly rather high.

SUMMARY OF THE INVENTION

The object of the present invention is to provide a dispenser for pasty products, particularly toothpastes, that meets the requirements of the sector, particularly concerning the use of plastic materials belonging to the same family, and overcomes the drawbacks mentioned in reference to the prior art.

This object is achieved by a pump head for a dispenser for pasty products, and by a dispenser as described and claimed herein. Additional advantageous embodiments are also described.

BRIEF DESCRIPTION OF THE FIGURES

The features and advantages of the dispenser according to this invention will become apparent from the following description, given as a non-limiting example in accordance with the figures in the accompanying drawings, wherein.

Figure 1:
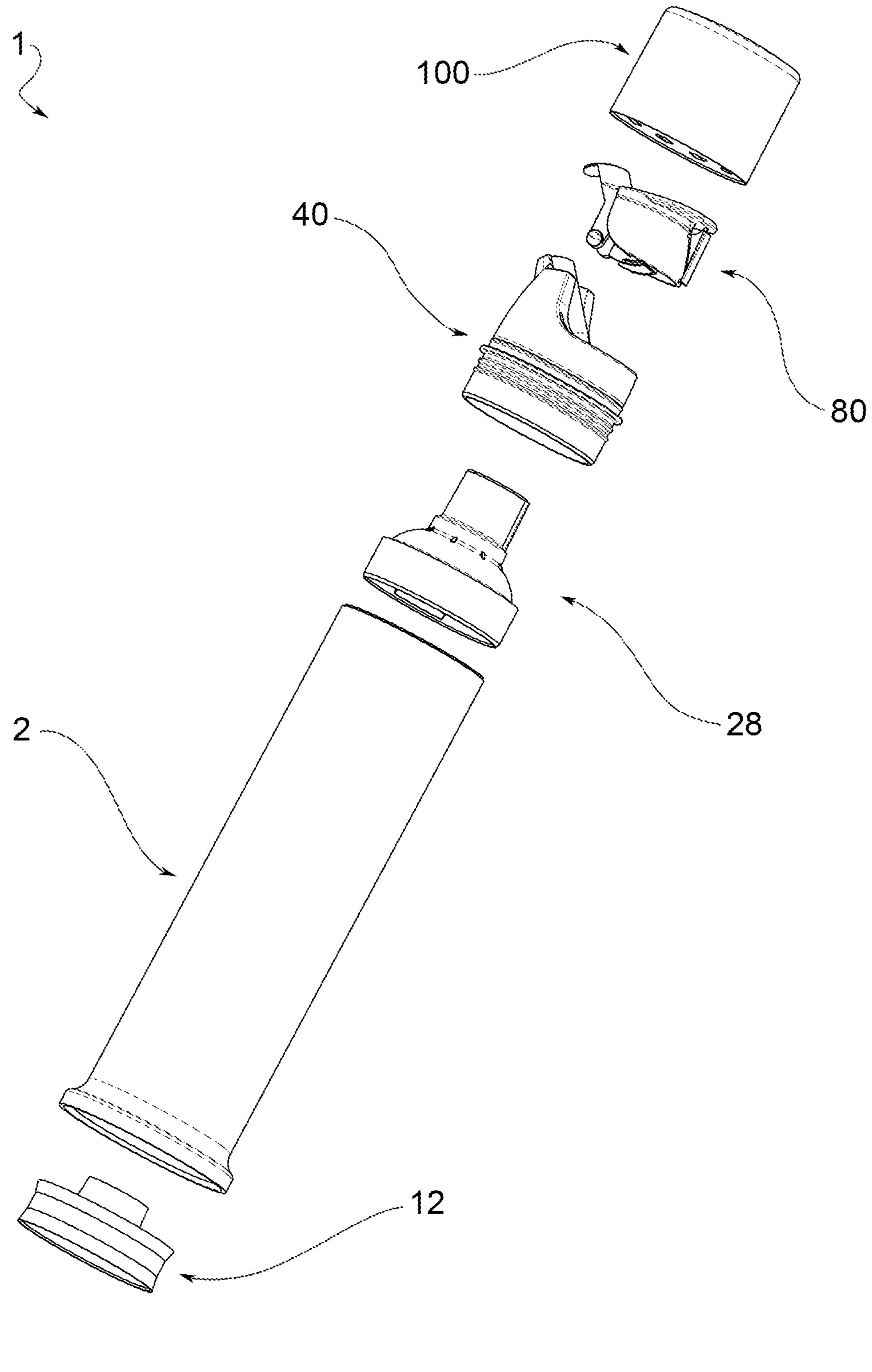
FIG. 1 depicts a dispenser according to an embodiment of the present invention, in separate parts.
Figure 2:
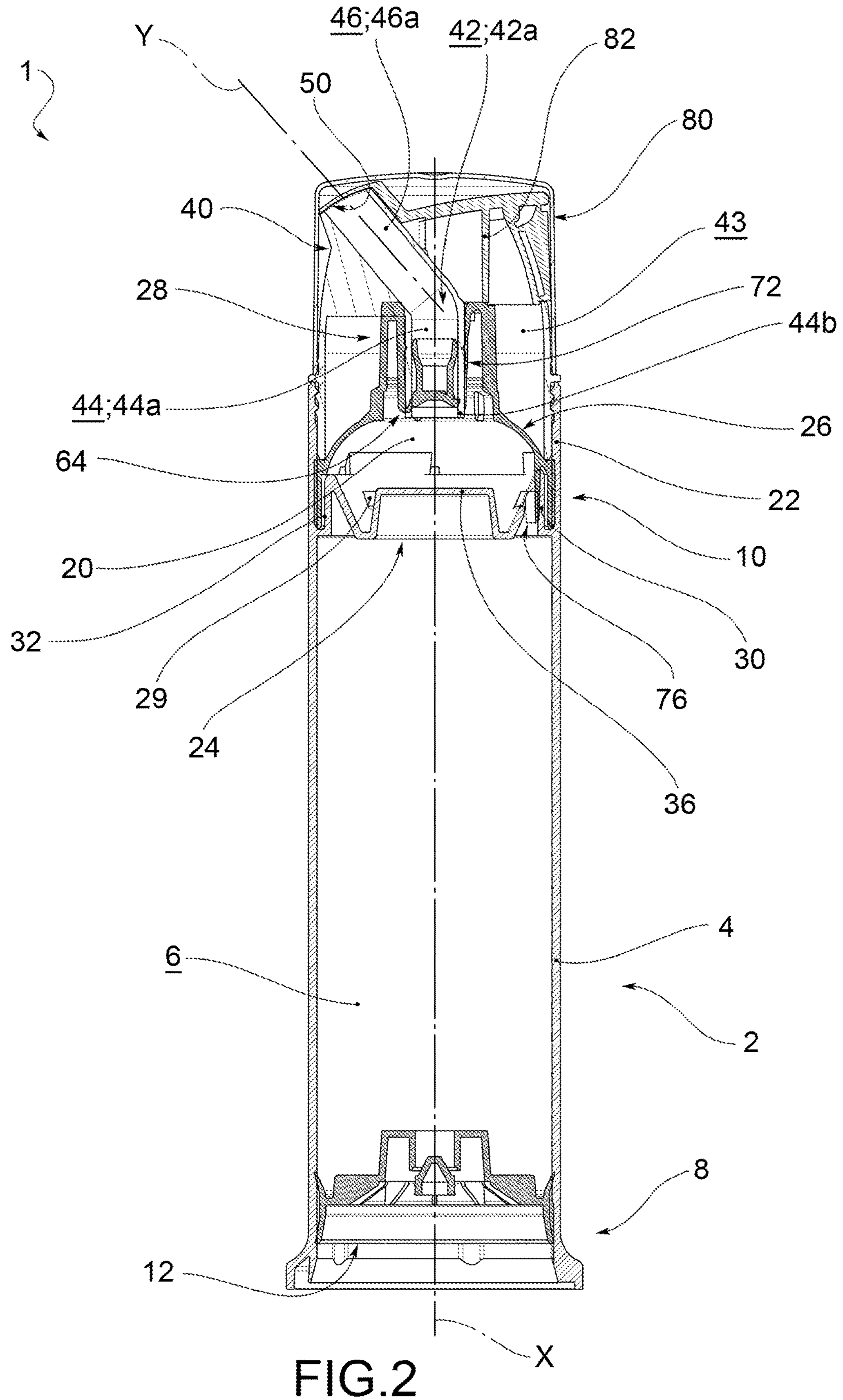
FIG. 2 is a longitudinal cross-sectional view of the dispenser in FIG. 1.
Figure 4:
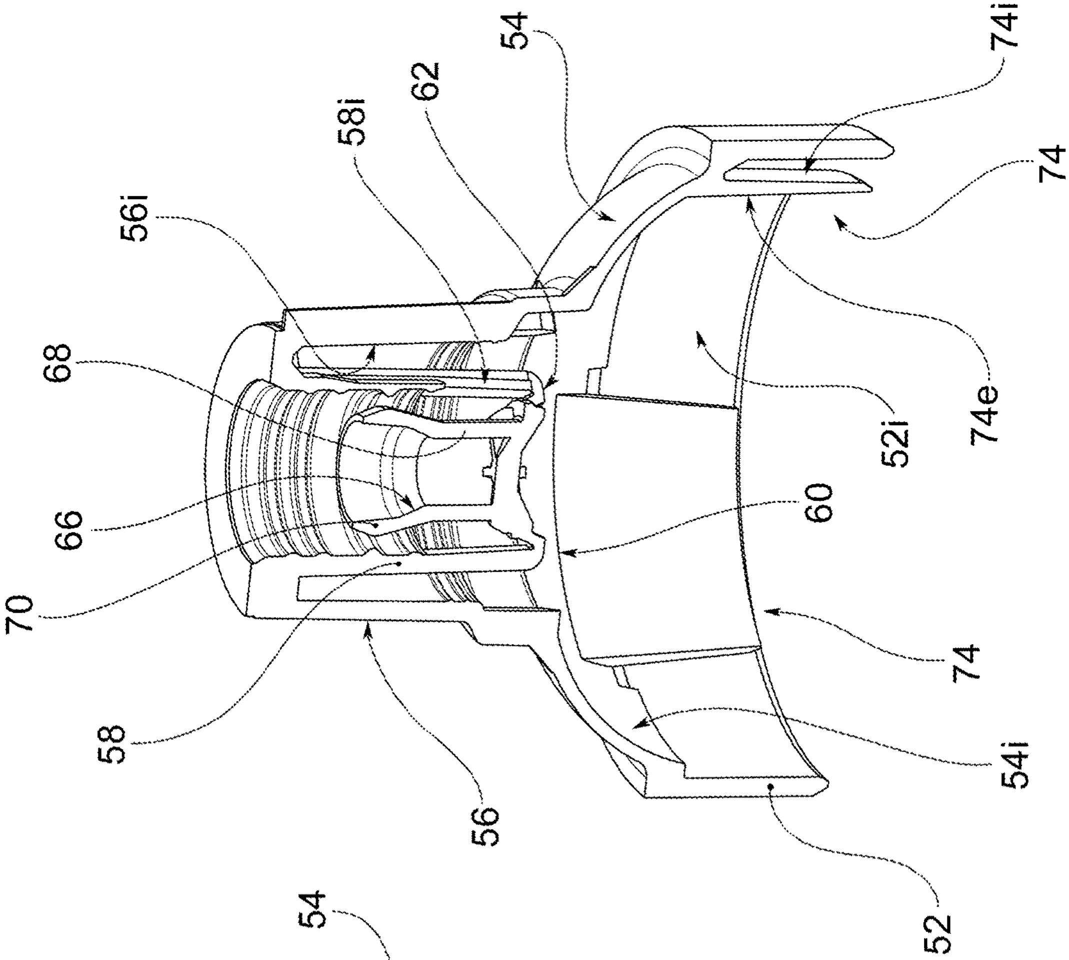
FIG. 4 is a partial cross-sectional view of the pump in FIG. 3.
Figure 3:
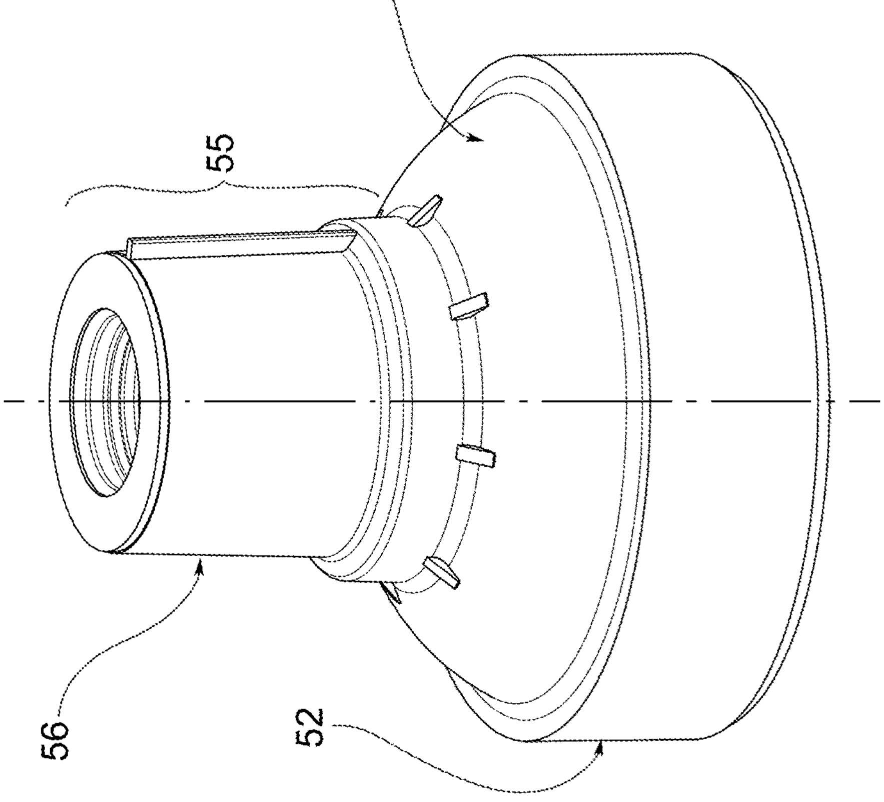
FIG. 3 depicts a dispenser pump according to one embodiment of the present invention.
Figure 5:
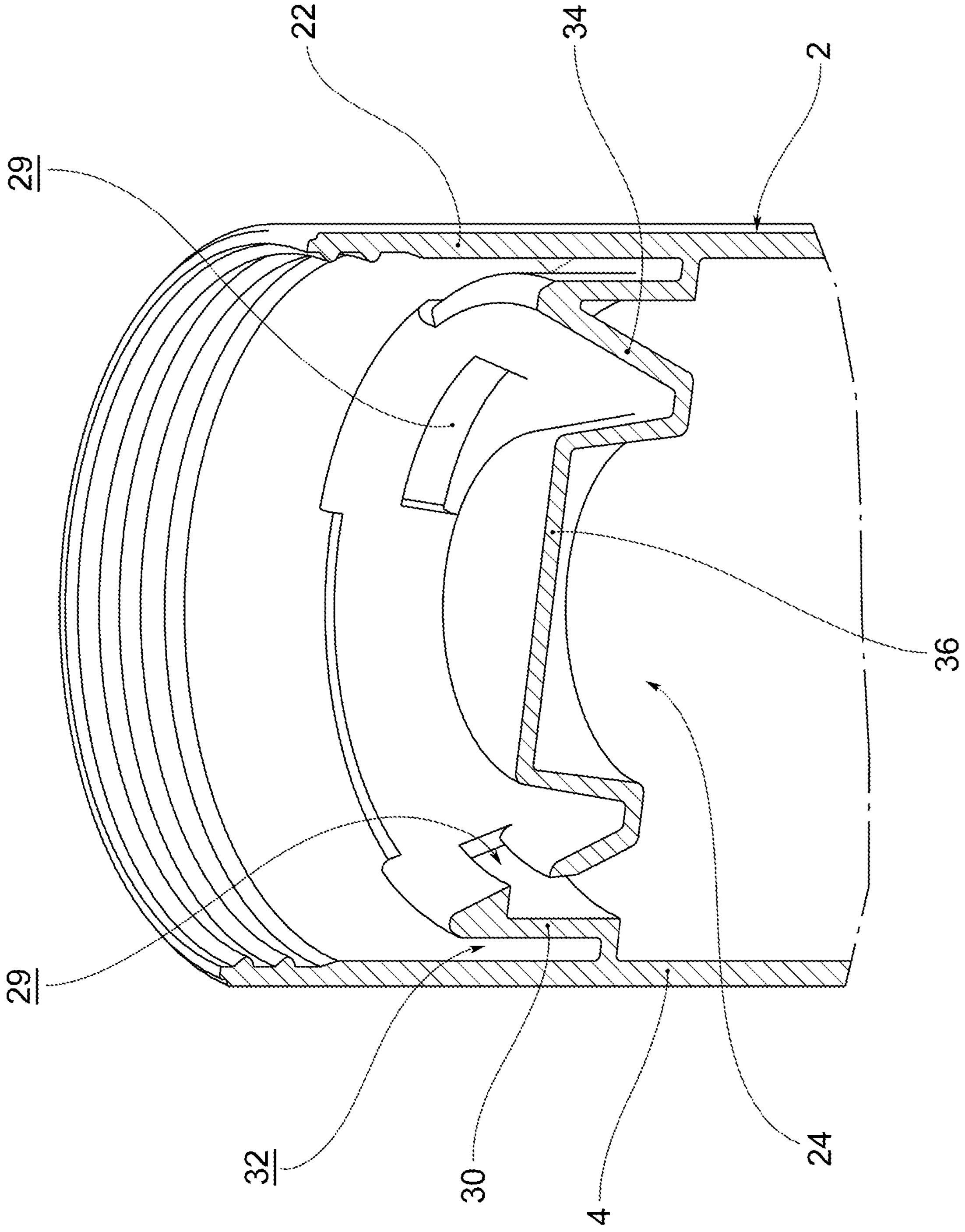
FIG. 5 shows a partial cross-sectional view of a dispenser container according to one embodiment of this invention.

FIG. *6a* is a cross-sectional view of a dispenser according to one embodiment of the present invention, in an initial or rest configuration;

FIG. *6b* is a cross-sectional view of the dispenser in FIG. *6a* in a dispensing configuration;

FIG. *6c* is a cross-sectional view of the dispenser in FIG. *6a* in a suction configuration.

DETAILED DESCRIPTION

In reference to the figures in the appended drawings, the number 1 refers to a dispenser for pasty products, particularly toothpastes, as a whole according to an embodiment of the present invention.

The dispenser 1 comprises a container tube 2, preferably made as a single part from plastic material, for example a polymer material belonging to the polyolefin group, such as polypropylene (PP).

The container tube 2 comprises an annular tube wall 4, typically circular and cylindrical, having a central axis X. The tube wall 4 delimits a periphery of a tube compartment 6 intended to contain the pasty product. The tube wall 4 goes from a lower end 8, which is itself open and through which the tube wall 4 is filled with the pasty product, to an upper end 10 to which a dispensing head 50, to be discussed later, is applied.

The dispenser 1 further comprises a piston 12 received into the tube compartment 6 by an interference fit, designed to slide axially from the lower end 8, where it is located when the tube compartment 6 is full of product, to the upper end 10 as the product is dispensed.

Preferably, the piston 12 is made of a plastic material, preferably a polymer material belonging to the polyolefin group, for example high-density polyethylene (HDPE).

The dispenser 1 further comprises a main chamber 20 placed at the upper end 10 of the container tube 2 for containing product that is about to be dispensed.

According to a preferred embodiment, the main chamber 20 is delimited annularly by an end section 22 of the tube wall 4, at the bottom by a separating wall 24 occupying the tube compartment 6 diametrically, and at the top by a cap 26 of a pump 28. The separating wall 24 is provided with a plurality of windows 29 passing through the thickness, through which the tube compartment 6 may communicate with the main chamber 20.

Preferably, the separating wall 24 is made as a single piece together with the container tube 2.

In addition, the separating wall 24 preferably comprises an annular outer portion 30, preferably coaxial with the tube wall 4, radially proximal to the end section 22 of the tube wall 4 with which it forms an annular seat 32 for the pump 28.

In addition, the separating wall 24 preferably comprises a functional portion 34 placed radially inside the outer portion 30, through which said windows 29 are made.

Preferably, the functional portion 34 has the shape of a truncated cone, for example coaxial with the tube wall 4, diverging toward the main chamber 20. Advantageously, the angle of the functional portion 34, as well as the width of the windows 29 facilitate the movement of the product from the tube compartment 6 to the main chamber 20 during a suction phase, to be discussed below.

In addition, the separating wall 24 preferably comprises a central flat surface 36 connected to the functional portion 34; the shape of the separating wall 24 preferably follows the shape of the piston 12 so as to allow an at least partial shape coupling when the product contained in the tube compartment has been used up, so that any residual product is kept to a minimum.

The dispenser 1 further comprises a fixed head 40 placeable on the container tube 2 at the upper end 10. For example, the head 40 is snapped into the end section 22 of the tube wall 4.

The head 40 comprises a dispensing tube 42 for connecting the main chamber 20 to the outside environment for dispensing the product.

Preferably, the dispensing tube 42 comprises an initial section 44 that opens directly into the main chamber 20, and an end section 46 connected to the initial section 44 and ending with an opening 50 for dispensing the product.

Preferably, the initial section 44 is coaxial with the tube wall 4 and therefore lies along said central axis X; the end section 46, however, is preferably at an angle and therefore lies along a dispensing axis Y that is inclined with respect to the central axis X.

The initial section 44 consists of an annular wall having an initial lateral surface **44*a* on the inside; the end section 46 consists of an annular wall having a lateral end surface 46*a* on the inside. The initial surface 44*a* and the end surface 46*a* together form a lateral surface 42*a* of the dispensing tube 42**.

Once the head 40 is placed on the container tube 2, a space 43 is delimited between said head 40 and the separating wall 24 in which is placed the pump 28, which is applied to and cooperates with the separating wall 24 and the dispensing tube 42.

The pump 28, consisting of a hollow shell, is made as a single part from plastic material, for example a polymer material belonging to the polyolefin group, such as low-density polyethylene (LDPE).

Preferably, the pump 28 comprises an annular connection portion 52 consisting, for example, of a preferably continuous cylindrical circular wall, designed to be housed by interference fit in the seat 32 formed by the tube wall 4 and the separating wall 24.

The pump 28 further comprises a dome-shaped elastically deformable cap 54 diverging toward the connection portion 52. Said cap 54 is designed to be deformed with respect to a rest condition in order to reduce the volume of the main chamber 20 and cause the product to be dispensed. Preferably, the cap 54 is connected to the connection portion 52 at a lower end.

The pump 28 further comprises, at the end opposite the end of the connection portion 52, a pump neck 55 connected to the cap 54 and protruding axially therefrom. The pump neck 55 is slidably inserted into the initial section 44 of the dispensing tube 42.

For example, the pump neck 55 consists of a tubular column portion 56, preferably coaxial with the central axis X, and a tubular guide portion 58 connected to the column portion 56 and contained radially and preferably also axially therein. In other words, the guide portion 58 forms a flap with respect to the column portion 56, thus making therewith an annular upside-down-U section. Again, in other words, an inside lateral surface **56*i* of the column portion 56 faces an inside lateral surface 58*i* of the guide portion 58**.

Preferably, the pump 28 further comprises a bottom 60 supported by the pump neck 55 and in particular by the guide portion 58; the bottom 60 is provided with a plurality of bottom openings 62 arranged circumferentially.

Once the pump 28 and the head 40 are placed on the container tube 2, the initial section 44 of the dispensing tube 42 is inside the guide portion 58 and, in an initial rest condition, the appropriately shaped free end **44*b* of said initial section 44 closes said bottom openings 62 of the bottom 60. In other words, the free end 44*b* and the bottom 60 provided with bottom openings 62 form an intermediate or shutoff valve 64**, the operation of which will be described below.

Preferably, the pump 28 further comprises an annular lip 66, protruding axially from the bottom 60, to the outside of the main chamber 20. For example, the lip 66 comprises a substantially cylindrical lip base 68 connected to the bottom 60 and a flared annular sealing portion 70, preferably chalice-shaped, connected to the lip base 68.

Once the pump 28 and the head 40 are placed on the container tube 2, the initial section 44 of the dispensing tube 42 is inside the guide portion 58, whereas the sealing portion 70 of the lip 66 is inserted into the initial section 44. In particular, the sealing portion 70 is in contact with the initial surface **44*a* of the initial section 44, forming a seal. The lip 66, and in particular the sealing portion 70 thereof, and the dispensing tube 42, and in particular the initial section 44 thereof, form an upper or delivery valve 72**, the operation of which will be described below.

In other words, the upper valve 72 and the intermediate valve 64 are spaced apart axially along the initial section 44 of the dispensing tube 42.

Preferably, an annular passageway chamber 67 is defined axially between the sealing portion 70 and the bottom 60 on the inside of the initial section 44 and on the outside of the lip base 68.

In addition, the pump 28 comprises a plurality of flexible flaps 74 protruding internally, for example from the inside lateral surface **54*i* of the cap 54 or from the connection area between the cap 54 and the connection portion 52. Each flap 74 has an inner flap surface 74*i* facing the inside lateral surface 54*i* of the cap 54 or the inside lateral surface 52*i* of the connection portion 52, and an opposite outer flap surface 74*e* facing toward the main chamber 20**.

Each flap 74 is capable of closing a corresponding window 29 of the separating wall 24 during a dispensing phase of the dispenser's operation. The flaps 74 and the corresponding windows 29 thus form a lower or suction valve 76, the operation of which will be described below.

The dispenser 1 further comprises an actuator 80, for example in the form of a button, held so as to be movable such as by rotation or translation from the head 40, and designed to influence the pump 28 so as to cause deformation of the cap 26 and product dispensing. For example, the actuator 80 comprises an influence portion 82 in contact with the connection area between the column portion 56 and the guide portion 58, such that the squeezing thereof causes deformation of the cap 26.

Preferably, the actuator 80 also comprises a closing portion 84 for closing the opening 50 of the dispensing tube in a rest configuration of the dispenser.

The actuator 80 is made as a single part from plastic material, for example a polymer material chosen from the polyolefin group, such as polypropylene (PP).

Lastly, the dispenser 1 comprises a cap 100 that can be placed on the head 40 to cover the actuator 80 and prevent accidental or undesirable actuation.

The cap 100 is made as a single part from plastic material, for example a polymer material chosen from the polyolefin group, such as polypropylene (PP).

Figures 6A, 6B, 6C:
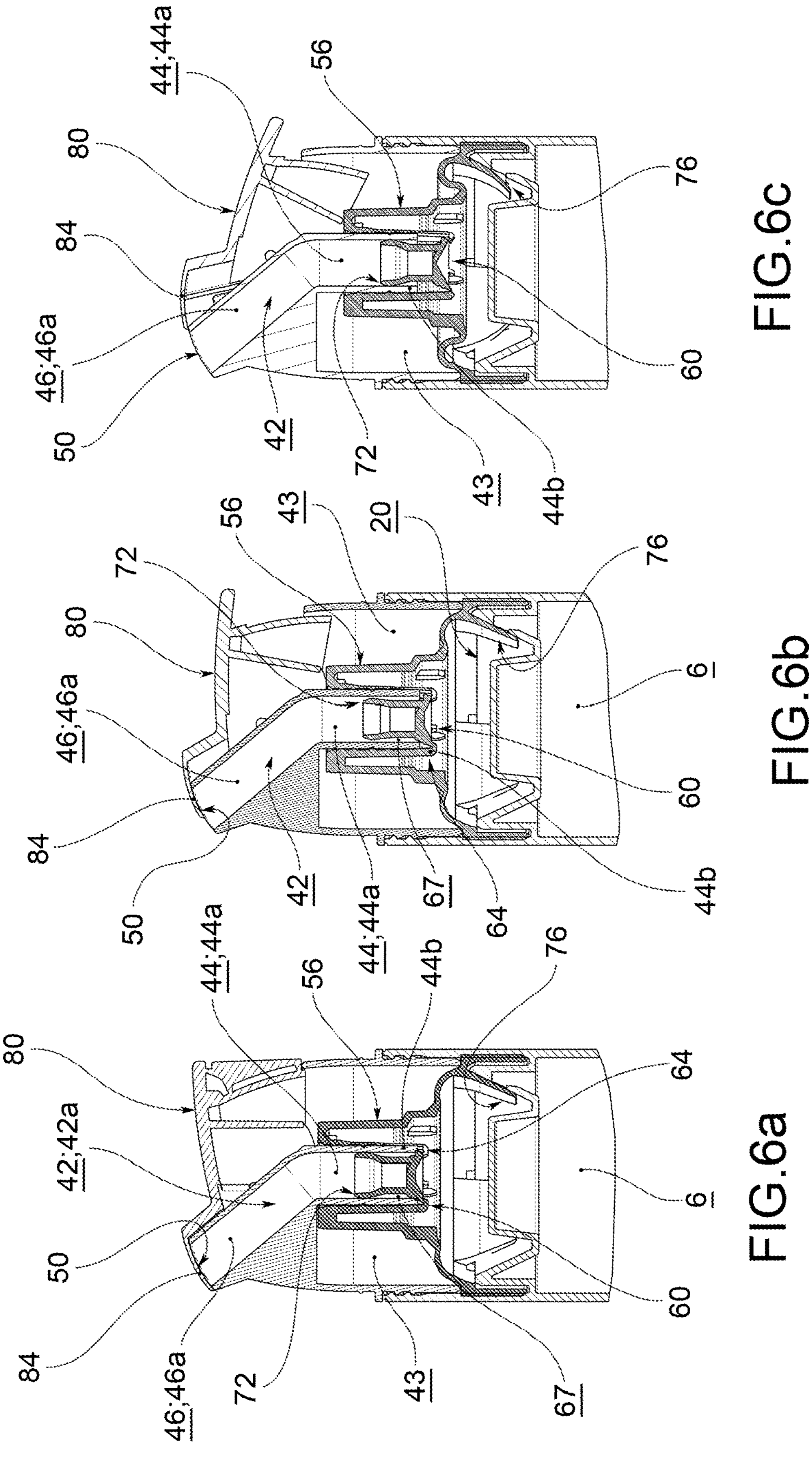

In an initial or rest configuration (FIG. 6*a*), the pump 28 is in an initial non-deformed condition, the lip 66 has a sealed contact with the initial surface 44*a* of the initial section 44 of the dispensing tube 42 (delivery valve closed), the bottom 60 is engaged with the lower end of the initial section 44 in such a way that the bottom openings 62 are blocked (shutoff valve closed), and the flaps 74 are engaged with the corresponding windows 29 so as to close them (suction valve closed). In addition, the closing portion 84 of the actuator 80 blocks the opening 50 of the dispensing tube 42.

A dispensing phase (FIG. 6*b*) takes place by actuation of the actuator 80 by gradually deforming the pump 28 and in particular the cap 54.

When the actuator 80 is actuated, the closing portion 84 is disengaged at least partially from the opening 50, leaving it free to dispense the product.

During the dispensing phase, the volume of the main chamber 20 is reduced and the overpressure caused by the squeezed product keeps the suction valve 76 in the closed configuration. In other words, the flaps 74 are pushed against the edges of the corresponding windows 29 and close them. This prevents the product contained in the main chamber 20 from returning to the tube compartment 6 of the tube 2.

At the same time, due to the thrust of the actuator 80, the column portion 56 lowers, preferably guided in this movement by the guide portion 58, which slides as it is guided in contact with the dispensing tube 42 and in particular with the initial section 44 thereof.

The lowering of the column portion 56 causes the bottom 60 to lower and disengage from the initial section 44 of the dispensing tube 42; in particular, the lower end of the initial section 44 comes out through the bottom openings 62. The shutoff valve 64 thus changes to the open configuration and the product contained in the main chamber 20 comes through the bottom openings 62 of the bottom 60.

At the same time, due to the action of the product which is now located between the bottom 60 and the initial section 44 of the dispensing tube 42, the sealing portion 70 is deformed elastically and moves away from the initial surface 44*a* of the initial section 44. The delivery valve 72 thus changes to the open configuration and the product may flow around the lip 68 through the initial section 44 to enter the end section 46 and come out through the opening 50 of the dispensing tube 42. Deformation of the lip 68 provides an easy passageway for the product to flow, even if very viscous.

In other words, with the shutoff valve 64 in the open configuration, the product initially passes through the bottom openings 62, fills the annular passageway chamber 67 while passing axially around the lip base 68, and then elastically deforms the sealing portion 70.

Preferably, when the delivery valve 72 changes to the open configuration, the sealing portion 70 is elastically deformed radially toward the inside, i.e. toward the central axis X, and moves away from the initial surface 44*a*.

When the actuator 80 reaches the end of travel, the dispensing phase ends and, after the actuator 80 is released, a suction phase occurs (FIG. 6*c*), during which time a predefined quantity of product contained in the tube compartment 6 enters the main chamber 20.

In particular, when the actuator 80 is released, the pump 28 tends to return to the non-deformed condition and influences the actuator in that direction, which tends to return to the initial condition. Consequently, the volume of the main chamber 20 tends to increase and the resulting partial vacuum causes the flaps 74 to bend, disengaging from the corresponding windows 29. A predefined quantity of product contained in the tube compartment 6 is thus drawn into the main chamber 20.

At the same time, the lip 66 comes into contact again with the initial surface 44*a* of the initial section 44 so that the delivery valve 72 returns to the closed configuration. This ensures that the product in the dispensing tube 42 between the delivery valve 72 and the opening 50 does not return to the main chamber 20, nullifying the suction of new product from the tube compartment 6.

At the same time, the closing portion 84 of the actuator 80 tends to return to the initial condition in which the opening 50 is blocked, thereby cutting off the flow of dispensed product and facilitating separation of the dispensed quantity.

Once the cap 54 has returned to the non-deformed condition, the bottom 60 also returns to the initial position in which it engages with the initial section 44; the shutoff valve 64 thus returns to the closed configuration and, since the overpressure in the main chamber has ceased, the suction valve 76 also returns to the closed configuration.

In other words, the shutoff valve 64 and the suction valve 76 provide dual sealing against passage of the product along the initial section 44.

According to an embodiment variant of the invention, the separating wall is a part made separately from the tube 4 and subsequently applied thereto.

Innovatively, the dispenser according to the present invention overcomes the drawbacks mentioned in reference to the prior art as it is capable of dispensing pasty products, including very viscous ones, which need large passageways so as not to generate resistance to actuation, without resorting to metal parts and by means of a generally simple and low-cost structure in which the pump incorporates multiple functions.

It is clear that a person skilled in the art, in order to satisfy current needs, could make modifications to the dispenser described above, said modifications all being contained within the scope of protection as defined in the following claims.

What is claimed is:

1. A manually-operable head assembly for a dispenser for a pasty product, comprising:

a head made in a single piece of a plastic material, configured to be applied to a container tube of the dispenser, the head being provided with a dispensing tube having an opening for dispensing the pasty product, and an initial section;

a pump, consisting of an internally hollow shell made in a single piece of a plastic material, comprising a pump neck slidingly inserted on the initial section of the dispensing tube, a dome-shaped cap connected to the pump neck, which is elastically deformable, and an annular connection portion connected to the dome-shaped cap; and an actuator made in a single piece of a plastic material, movably supported by the head and configured to be manually operated to at least partially deform the pump and obtain dispensing of the pasty product;

wherein the pump comprises a flexible annular lip, protruding externally to the pump and inserted into the initial section and configured to sealingly come into contact with an initial surface of the initial section to form an upper or delivery valve, wherein the flexible annular lip comprises a sealing portion configured to be elastically deformable radially toward inside the initial section and separate from the initial surface, wherein the pump further comprises a bottom supported by the pump neck, provided with a plurality of bottom openings, and the initial section of the dispensing tube is engageable with the bottom openings to form an intermediate or shutter valve, and wherein the upper or delivery valve and the intermediate or shutter valve are separated axially along the initial section, thereby delimiting an annular passageway chamber therebetween.

2. The manually-operable head assembly of claim 1, wherein the sealing portion has a flared annular shape.

3. The manually-operable head assembly of claim 1, wherein the pump neck consists of a tubular column portion connected to the dome-shaped cap and a tubular guide portion connected to the tubular column portion, arranged radially inside the tubular column portion and in contact with the initial section of the dispensing tube.

4. The manually-operable head assembly of claim 1, wherein the pump further comprises at least one flexible flap, protruding internally from the dome-shaped cap or from the annular connection portion and adapted to close windows of the container tube to form a lower or suction valve of the dispenser.

5. The manually-operable head assembly of claim 4, wherein the at least one flexible flap has an inner flap surface facing an inner side surface of the dome-shaped cap or an inner side surface of the annular connection portion, and an opposite outer flap surface.

6. The manually-operable head assembly of claim 1, wherein the plastic material of the head, the plastic material of the pump and the plastic material of the actuator are polymer materials selected from the polyolefin group.

7. A dispenser for a pasty product, comprising:

a container tube made in a single piece of a plastic material, having a tube compartment for containing the pasty product;

a manually-operable head assembly comprising:

a head made in a single piece of a plastic material, configured to be applied to the container tube of the dispenser, the head being provided with a dispensing tube having an opening for dispensing the pasty product, and an initial section;

a pump, consisting of an internally hollow shell made in a single piece of a plastic material, comprising a pump neck slidingly inserted on the initial section of the dispensing tube, a dome-shaped cap connected to the pump neck, which is elastically deformable, and an annular connection portion connected to the dome-shaped cap; and an actuator made in a single piece of a plastic material, movably supported by the head and configured to be manually operated to at least partially deform the pump and obtain dispensing of the pasty product;

wherein the pump comprises a flexible annular lip protruding externally to the pump and inserted into the initial section and configured to sealingly come into contact with an initial surface of the initial section to form an upper or delivery valve, wherein the flexible annular lip comprises a sealing portion configured to be elastically deformable radially toward inside the initial section and separate from the initial surface, applied to the container tube; and a separating wall placed between the tube compartment and the pump, provided with windows, wherein the pump further comprises a bottom supported by the pump neck, provided with a plurality of bottom openings, and the initial section of the dispensing tube is engageable with the bottom openings to form an intermediate or shutter valve, and wherein the upper or delivery valve and the intermediate or shutter valve are separated axially along the initial section, thereby delimiting an annular passageway chamber therebetween.

8. The dispenser of claim 7, wherein the separating wall comprises a functional truncated cone portion flared towards the pump, and wherein the windows are formed through the functional truncated cone portion.

9. The dispenser of claim 7, wherein the separating wall is made in a single piece with the container tube.

10. The dispenser of claim 7, wherein the plastic material of the container tube is a polymer material selected from the polyolefin group.

11. The dispenser of claim 7, comprising a piston, accommodated by interference into the tube compartment and configured to axially slide as the pasty product is gradually dispensed, and wherein the piston is made in a single piece of a plastic material.

12. The dispenser of claim 11, wherein the plastic material of the piston is a polymer material selected from the polyolefin group.

13. The manually-operable head assembly of claim 1, wherein the pasty product is a toothpaste.

14. The dispenser of claim 7, wherein the pasty product is a toothpaste.

* * * * *